Patented Oct. 8, 1940

2,216,752

UNITED STATES PATENT OFFICE 2,216,752

STABILIZED LUBRICATING OIL COMPOSITION

Raphael Rosen, Elizabeth, N. J., assignor to Standard Oil Development Company, a corporation of Delaware No Drawing. Application April 3, 1937, Serial No. 134,900

10 Claims. (Cl. 252—45)

This application is a continuation-in-part of my co-pending application Serial No. 704,131, filed December 27, 1933, Patent No. 2,085,045.

The present invention relates to improved lubricating oils or greases, and more particularly to lubricants stabilized by the addition of certain new substances of the class of oxidation inhibitors and to the particular inhibitors themselves. The invention will be fully understood from the following description:

Mineral oils when well refined, and particularly the oils of a predominantly paraffinic type, are characterized by a tendency to oxidize more readily than the crude cuts from which they are derived. In order to offset this tendency it is desirable to add to the oil certain amounts of substances of the class of oxidation inhibitors.

Among the oxidation inhibitors the phenolic and the naphtholic types are known as well as the alkylated derivatives of these materials; for example, ortho or meta cresol, alpha and beta naphthol, the dihydroxy- and poly hydroxyphenols and cresols such as hydroquinone, resorcinol, pyrogallol and the like. Alkylated phenols and naphthols are also useful, such as the cresols mentioned above and similar materials in which the alkyl group contains several carbon atoms such as butyl resorcinols, amyl phenols and naphthols and similar substances.

Another type of the known inhibitors are the aromatic amines, and any of the above mentioned hydroxy compounds finds a counterpart in the corresponding substance which has an amino group substituted for the hydroxy group.

Still other inhibitors are known such as the aromatic mercaptans, and among these the naphthyl mercaptans both alpha and beta may be mentioned as suitable examples. Aromatic disulfides and polysulfides are also useful as inhibitors, such as cresyl or naphthyl disulfides or the corresponding polysulfides. The following formulae are used to characterize these substances respectively:

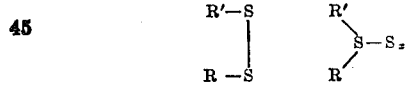

in which R' represents an aromatic group and R may represent either an aromatic or an aliphatic group and $x$ is 2 or greater.

Careful studies of the above inhibitors have brought out the fact that each inhibitor is characterized by a temperature range in which it exerts its inhibiting effect, and it is further observed that if the temperature is raised only a relatively few degrees above the upper limit the substance loses its inhibiting effect almost completely and becomes useless. For example, an increase of 10 or 25° C. is sufficient to completely destroy the value of the inhibitor so sharply defined is the upper temperature limit. It has been found, however, that the substitution of an oxygen, sulfur or other metalloid atom in the aryl groups of these compounds makes them stable at considerably higher temperatures. The oxygen, sulfur, selenium or tellurium atom is attached directly to the ring in the form of an ether, one group comprising the substituted aromatic and the other may be either a similar substituted aromatic or, a single unsubstituted aromatic radicle or preferably, a short chain aliphatic radicle as in the following formula, where R and R' have the same significance as above and D is the dominant inhibitor group one from the class of hydroxy, amino, disulfide or polysulfide, and $x$ is the atom of oxygen, sulphur, selenium or tellurium in an ether form.

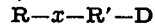

As an instance of this stabilization effect, it has been found that the cresolic inhibitors are practically ineffective if the temperatures reach 200° C., and for practical purposes 175° C. is the upper limit of their usefulness. At 150-175° C. these materials are substantially as good as the new sulfur substituted materials, but the latter are excellent at temperatures even above 200° C. while the unsubstituted cresolic inhibitors become practically ineffective. The particular phenomenon pointed out here is singular because as a general rule the simple aromatic or aliphatic ethers, thio ethers and the like themselves have little or no value as inhibitors and the sole value of this group appears to consist in stabilizing the active group of the compound by which is meant the hydroxyl, the amino, the disulfide or polysulfide groups, as indicated above.

As examples of the type of substances which are intended, the following structural formulas are presented. It will be understood that the substances depicted are merely illustrations and that the particular position of the hydroxyl, amino or other active groups to the stabilizing sulfur atom is not of primary importance. Furthermore this list might be considerably amplified but in all cases it appears to be the combination of the oxygen sulfur or other atom with the dominant or reactive group. It is preferable to have both of these groups in the same aryl group whether mono or polycylic and also preferably in the same ring in said group.

As examples of some of the particular inhibitors may be mentioned the following:

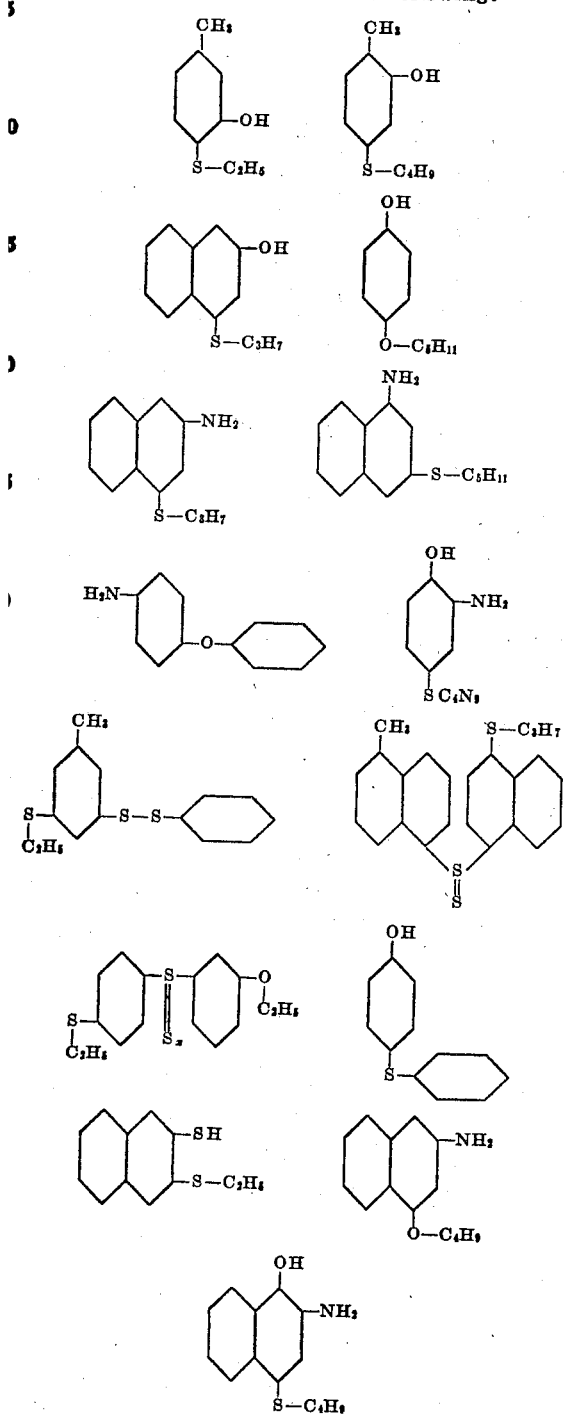

As an example of the effect of the stabilized inhibitors, the following tests are given:

I. In each of the following cases the oil used is a mineral white oil prepared by heavy treatment with fuming sulfuric acid, and characterized by a higher rate of oxidation than the crude cut from which it is derived. The oxidation tests are carried out in an exactly comparable manner for each test, oxygen being passed through a closed system in which 10 cc. samples of the oil are maintained at the specified test temperature. At intervals of fifteen minutes the amount of oxygen remaining is measured and the amount dissolved is taken by difference. The oil itself, without any inhibitor whatever, showed an absorption rate of 254 cc. of oxygen during the first fifteen minutes at 175° C. while at 200° C. it was even higher >300 cc. which is too high to be accurately determined by the methods employed. When 1% of a secondary hexyl phenol is added the oxidation rate at 175° C. and at 200° C. respectively were as follows, the time intervals being fifteen minutes each:

| Time | 1% hexyl phenol— | |
| --- | --- | --- |
| | @ 175° C. | @ 200° C. |
| 1 | 1.6 | >200 |
| 2 | .2 | >200 |
| 3 | 4.8 | >200 |
| 4 | 154.0 | >200 |

The above table shows that the alkyl phenol is an effective inhibitor at 175° C. but that it shows little or no effect at 200° C. In the following table is shown the effect of .1% of para hydroxy phenyl normal amyl sulfide:

| Time | Oxidation test— | |
| --- | --- | --- |
| | @ 175° C. | @ 200° C. |
| 1 | 2 | 5 |
| 2 | 0 | 7 |
| 3 | 2 | 6 |
| 4 | 0 | 11 |
| 5 | 0 | 8 |
| 6 | 0 | 17 |

The above table shows that the sulfur-containing inhibitor was very effective, even at 200° C.

II. To illustrate the statement made above that the sulfide group itself is substantially ineffective as an inhibitor, a test was made similar to the above using .1% of ethylene phenyl sulfide:

| Time | @ 200° C. |
| --- | --- |
| 1 | Above 200. |
| 2 | Above 300. |

From these tests it will be seen that the hydroxyl group is evidently the active group and that the sulfide merely acted for stabilization of the dominant inhibitor group.

III. Hydroquinone mono methyl ether

is blended in a concentration of 0.2% in a highly refined petroleum lubricating oil having a Saybolt viscosity of 56 seconds at 210° F. Both the original oil and the blend were tested to determine their tendency to deposit solid matter upon heated metallic surfaces, by the cone test. The original oil gave a deposit of 0.66 gram, while the blend gave a deposit of 0.46 gram.

The cone consisted in slowly dropping the oil to be tested over a heated steel cone, having a circumferential groove milled out in a screw fashion on the periphery so as to allow a time of contact of about 1 minute between the heated steel surface and the oil. A volume of 60 cc. of oil is dropped from a dropping funnel during a period of 2 hours to obtain this time of contact. The temperature of the cone is maintained at 250° C. since this represents approximately the extreme temperature to which oils are exposed in ordinary engine use. The cone is weighed before the test. After all the oil is run over the metal surface, the cone is washed with naphtha to remove adhering oil and the total deposit left is obtained by difference in weight. This value is reported in grams.

IV. Dimethyl aminophenol sulfide $$[(CH_3)_2NC_6H_3(OH)]_2S$$

is blended in a concentration of 0.2% with a highly refined viscous petroleum lubricating oil. Tests of the original oil and the blend gave the following results:

|  | Oxidation test at 200° C. | Cone test |
| --- | --- | --- |
| Original oil | 112-95 | 0.42 |
| Blend | 26-19-18-16 | 0.29 |

The invention is not to be limited to any theory of inhibitor action nor to any specific compounds disclosed but only to the claims in which it is desired to claim all novelty inherent in the invention.

I claim:

1. Petroleum lubricating oil suitable for use at high temperatures of the order of 200° C. containing as an oxidation inhibitor a small amount of an oil soluble compound with an aromatic nucleus which has directly attached thereto both an inhibitor group of the class consisting of hydroxyl, amino, sulfur, disulfide and polysulfide and a negative element of group VI of the periodic table, attached to the nucleus in an ether form.

2. A well refined petroleum lubricating oil suitable for use as a lubricant at high temperatures containing as an oxidation inhibitor a small amount of an oil soluble compound represented by the following formula: R—O—R'—D in which R is an aryl or alkyl radical, R' is an aryl radical and D is a hydroxyl radical, an amino radical or a radical containing from 1 to 3 or more elements of the sulfur family attached to the aryl nucleus.

3. A well refined petroleum lubricating oil suitable for use as a lubricant at high temperatures containing as an oxidation inhibitor a small amount of an oil soluble compound represented by the following formula: R—O—R'—OH in which R is an alkyl radical and R' is an aryl radical.

4. A lubricating oil stabilized against oxidation at temperatures above 175° C. comprising a refined viscous mineral oil base and a small amount of hydroquinone mono methyl ether.

5. A well refined petroleum lubricating oil suitable for use as a lubricant at high temperatures containing as an oxidation inhibitor a small amount of an oil soluble compound represented by the following formula: R—X—R'NR$_2$'' in which R is an aryl or alkyl radical, X is an element of the sulfur family, R' is an aryl radical and R'' is H or an alkyl radical.

6. A lubricating oil stabilized against oxidation at temperatures above 175° C. comprising a refined viscous mineral oil base and a small amount of dimethyl aminophenol sulfide.

7. A well refined petroleum lubricating oil suitable for use as a lubricant at high temperatures containing as an oxidation inhibitor a small amount of an oil soluble compound represented by the following formula: R—X—R'—S$_y$ in which R is an aryl or alkyl radical, X is an element of the sulfur family, R' is an aryl radical and $y$ is an integer from 1 to 3 or more.

8. A lubricating oil containing a stabilized oxidation inhibitor of the general formula $$HOR'—X—R$$

where X is one of the class oxygen and sulfur, where R' is an aryl and where R is an alkyl when X is oxygen and aryl when X is sulfur.

9. A well refined petroleum lubricating oil suitable for use as a lubricant at high temperatures containing as an oxidation inhibitor a small amount of an oil soluble compound represented by the following formula: R—X—R'—S$_y$—Z, in which R is an aryl or alkyl radical, X is an element of the sulfur family, R' is an aryl radical, $y$ is at least 2, and Z is an aryl group which may be further substituted.

10. A well defined petroleum lubricating oil, suitable for use as a lubricant at high temperatures, containing as an oxidation inhibitor small amount of ethoxy-phenyl-ethyl thioether phenyl polysulfide.

RAPHAEL ROSEN.